L. F. LITTLE.
VENTILATING FLOUR BOARD FOR ROLLER MILLS.
APPLICATION FILED MAR. 1, 1915.
1,161,486. Patented Nov. 23, 1915.
2 SHEETS—SHEET 2.
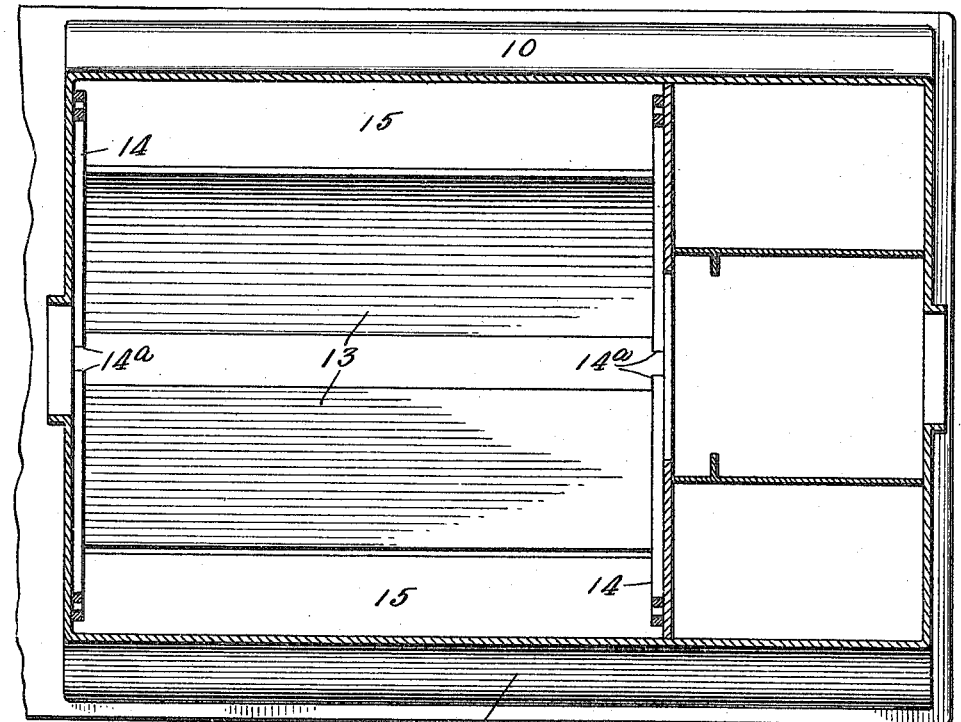
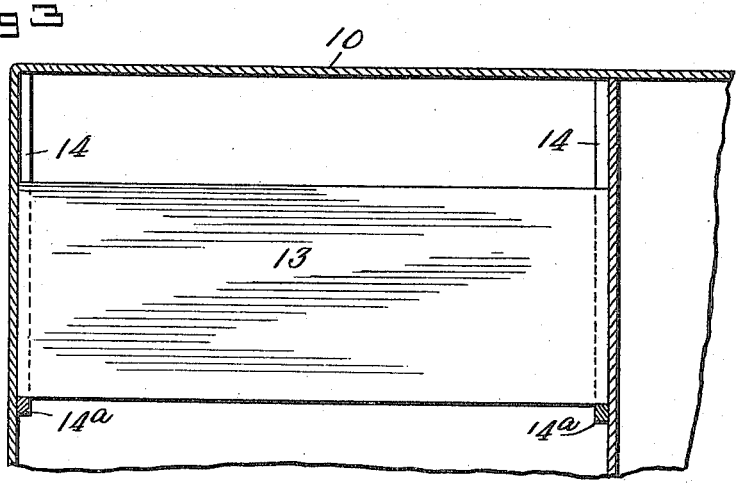

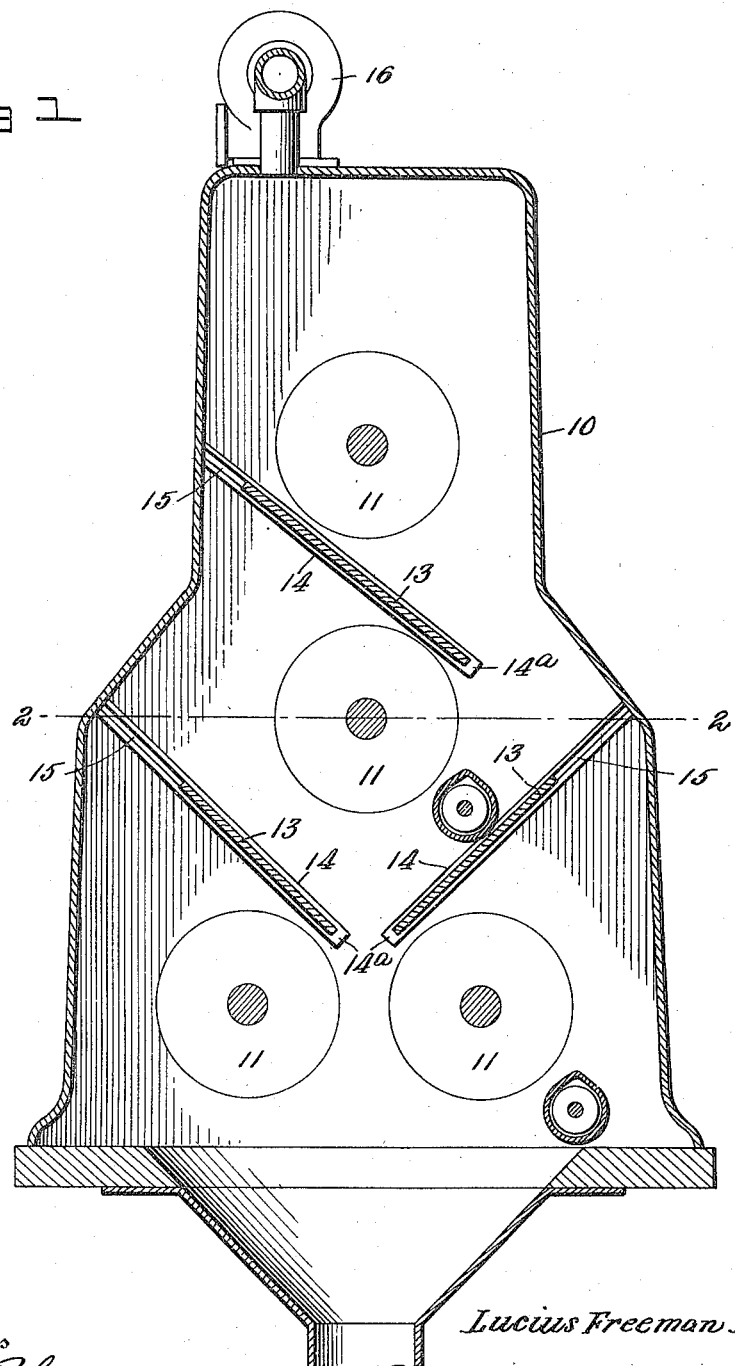

UNITED STATES PATENT OFFICE.

LUCIUS FREEMAN LITTLE, OF OWENSBORO, KENTUCKY, ASSIGNOR TO THE ANGLO-AMERICAN MILL CO., OF OWENSBORO, KENTUCKY, A CORPORATION OF KENTUCKY.

VENTILATING FLOUR-BOARD FOR ROLLER-MILLS.

1,161,486.      Specification of Letters Patent.      Patented Nov. 23, 1915.

Application filed March 1, 1915. Serial No. 11,267.

*To all whom it may concern:*

Be it known that I, LUCIUS FREEMAN LITTLE, a citizen of the United States, residing at Owensboro, in the county of Daviess and State of Kentucky, have invented new and useful Improvements in Ventilating Flour-Boards for Roller-Mills, of which the following is a specification.

The present invention relates to roller mills of that type in which the reducing and bolting mechanisms are inclosed within a casing and in which the grain, fed in at the top through a suitable feed opening is first reduced, the flour separated out, the middlings removed, and the residue either discharged or returned to the reduction rolls for further reduction. In this type of mill it is customary to use flour boards so disposed with relation to the centrifugal dressers that they will direct the flour which is bolted to the proper point of delivery to the hopper without allowing flour from the centrifugal above to fall onto the centrifugal below. It is obvious that such flour boards must incline downwardly, and, furthermore, that they must extend across the flour-bolting section of the centrifugal dresser so as to receive and direct the discharge from the dressers. It is customary to ventilate such mills by means of a suitable ventilating fan or suction device, ordinarily placed at the top of the mill casing so that the heated air may be drawn from the interior of the mill and discharged, and overheating of the interior and retardation or interference with the bolting action is avoided.

In mills heretofore known to me difficulty has been experienced in thoroughly ventilating the bolting section of the mill for the reason that the inclined flour boards would pocket the air and during a continuous run of the mill this air pocketed between the flour boards and the mill casing would become so heated as to be detrimental to the proper dressing of the flour through the bolting fabric, and it was impossible to secure the proper ventilation. It is with the object of overcoming this difficulty which has been experienced that I have devised the construction hereinafter described and shown in the accompanying drawings, in which, Figure 1 is a vertical section of a mill provided with the ventilating flour boards which I have invented. Fig. 2 is a horizontal sectional view on the line 2—2 of Fig. 1. Fig. 3 is a detail to show the ventilating board and its supports.

Referring to the drawings by numbers, like numbers indicating like parts in the several views, 10 indicates the mill casing which, as stated, is closed and in which casing are mounted the usual breaks and reduction rolls and the centrifugal dressers 11 (conventionally shown) and such other instrumentalities as are essential to the operation of the ordinary roller mill.

In proper relation to the centrifugal dressers I place the flour boards 13 which extend across the flour bolting section of the dressers and in such position as to receive the discharge from the reels and direct it to the proper delivery point. The boards 13 may be mounted in any suitable manner, although preferably their ends engage and slide in ways 14 formed on the inner faces of the mill walls, so that they may be readily inserted when the mill is assembled, or withdrawn for the purpose of repairs or substitution of boards of different widths, the boards 13 resting at their lower ends on stops 14$^a$ at the lower ends of the ways 14. The said boards 13 are of such width as that they will receive and properly direct the discharge from the bolting instrumentalities, but they are narrow enough to leave a clear space 15 between their upper edges and the walls of the mill casing, as shown in Figs. 1 and 2, so that there will be a clear passage behind the boards from the bottom of the mill casing to the top and no pocketing of air beneath the boards can occur.

The mill casing is provided at the top with any suitable suction device 16 which, while the mill is in operation, will exert a continuous suction on the mill interior and constantly withdraw therefrom the air which has been heated by the friction of the rolls and centrifugal dressers, and which in the absence of ventilation would be raised to a temperature detrimental to the proper dressing of the flour. By thus arranging the flour boards I am enabled to avoid all pocketing of air and secure a very complete and steady draft for ventilating purposes throughout the entire flour bolting section. It will be obvious that by this arrangement flour boards 13 of different widths may be used so as to vary the ventilating spaces as may be necessary, for in some instances a very small space may be sufficient to eliminate pocketing of air beneath the flour boards, while in other cases this ventilating space would have to be increased.

It is to be understood that changes which are within the range of mechanical skill may be made in the construction disclosed without departing from the spirit of my invention, the present embodiment being merely illustrative and in no sense restrictive.

I claim:—

1. In a mill of the inclosed type, the combination of a mill-casing, flour-dressing reels mounted in said casing, flour-boards so disposed as to properly direct the dressed-out flour, means for drawing air upwardly through said casing, and means for so supporting said boards as to give them an inclined position with their upper edges separated from the mill casing, to eliminate air-pockets and permit free ventilation throughout the mill interior.

2. In a mill of the inclosed type, the combination of a mill-casing, flour-dressing reels mounted in said casing, means for drawing air upwardly through said casing, inclined grooved guideways on the ends of the mill-casing extending from a point below the reels to the edge of the mill-casing with board supports at their lower ends, and a series of flour-boards mounted in the grooves of said guide-ways to properly direct the dressed out flour, said guide-ways being so constructed as to position said boards with their upper edges separated from the mill-casing whereby to eliminate air-pockets and provide a continuous passage along the walls of the casing to permit free ventilation throughout the mill interior.

In testimony whereof I have hereunto set my hand in presence of two subscribing witnesses.

LUCIUS FREEMAN LITTLE.

Witnesses:
GERTRUDE M. STUCKER,
C. H. FESLER.

Copies of this patent may be obtained for five cents each, by addressing the "Commissioner of Patents, Washington, D. C."